Dec. 12, 1933.  L. F. NENNINGER  1,938,778
CUTTER GUARD
Filed Nov. 14, 1930   3 Sheets-Sheet 1
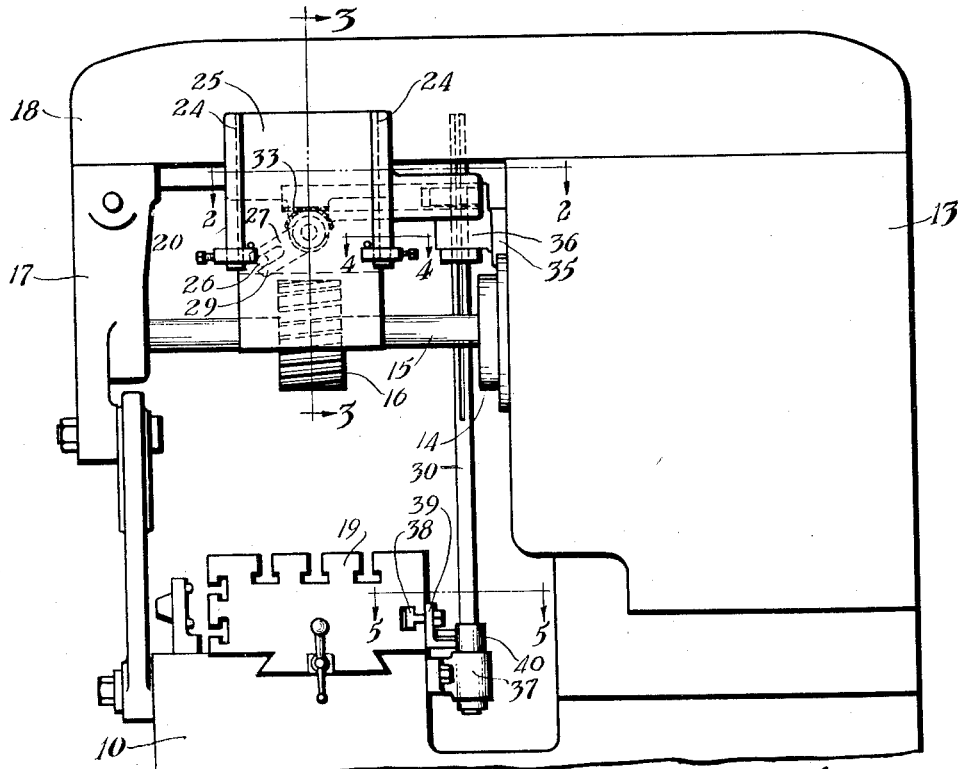
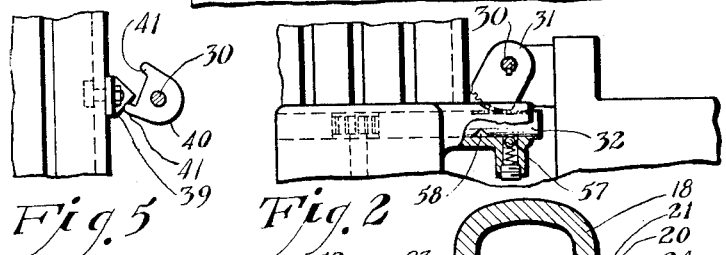
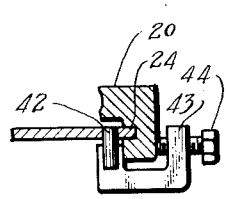
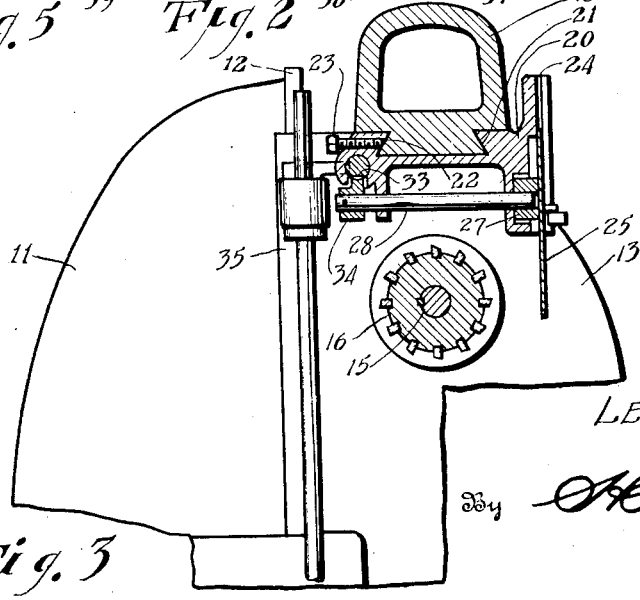
Inventor
LESTER F. NENNINGER
By H. K. Parsons
Attorney Dec. 12, 1933.  L. F. NENNINGER  1,938,778
CUTTER GUARD
Filed Nov. 14, 1930  3 Sheets-Sheet 2
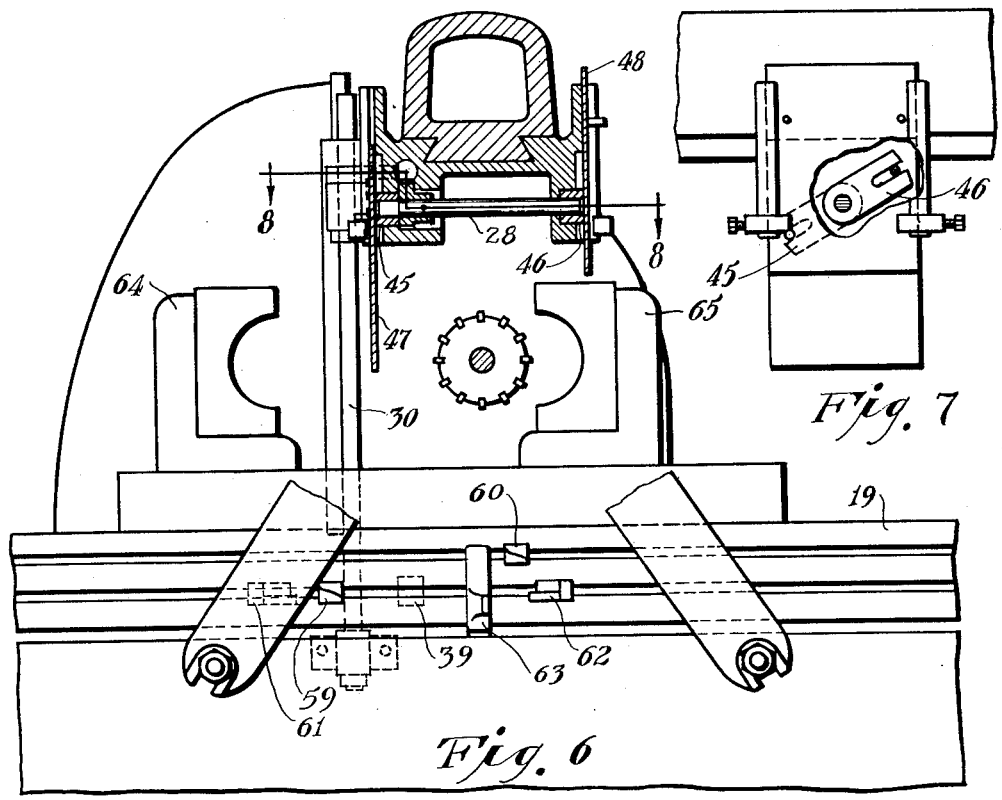
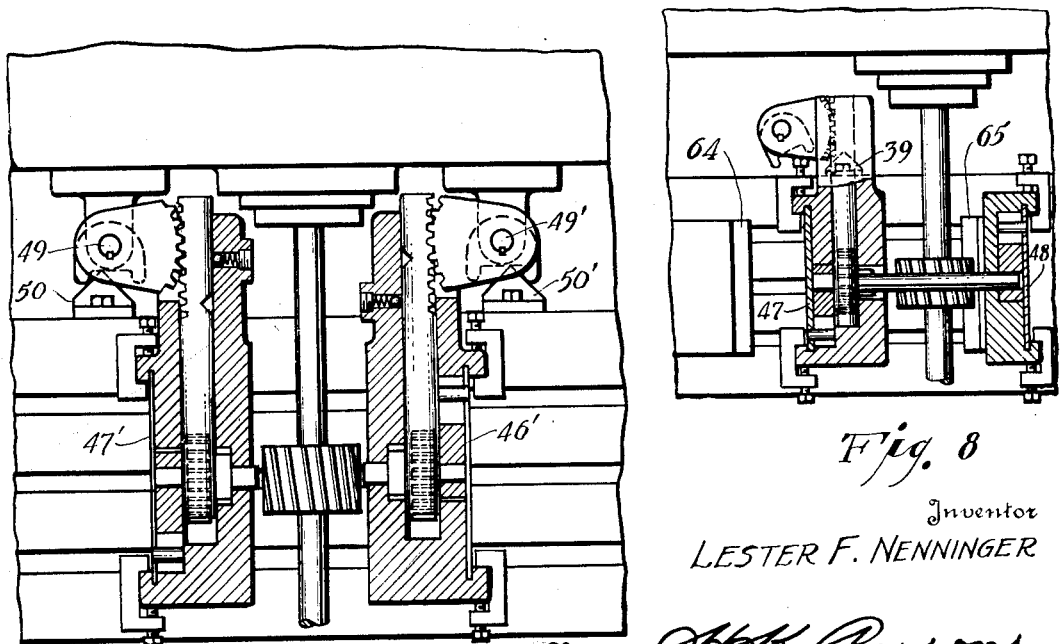
Inventor
LESTER F. NENNINGER Dec. 12, 1933.  L. F. NENNINGER  1,938,778
CUTTER GUARD
Filed Nov. 14, 1930  3 Sheets-Sheet 3
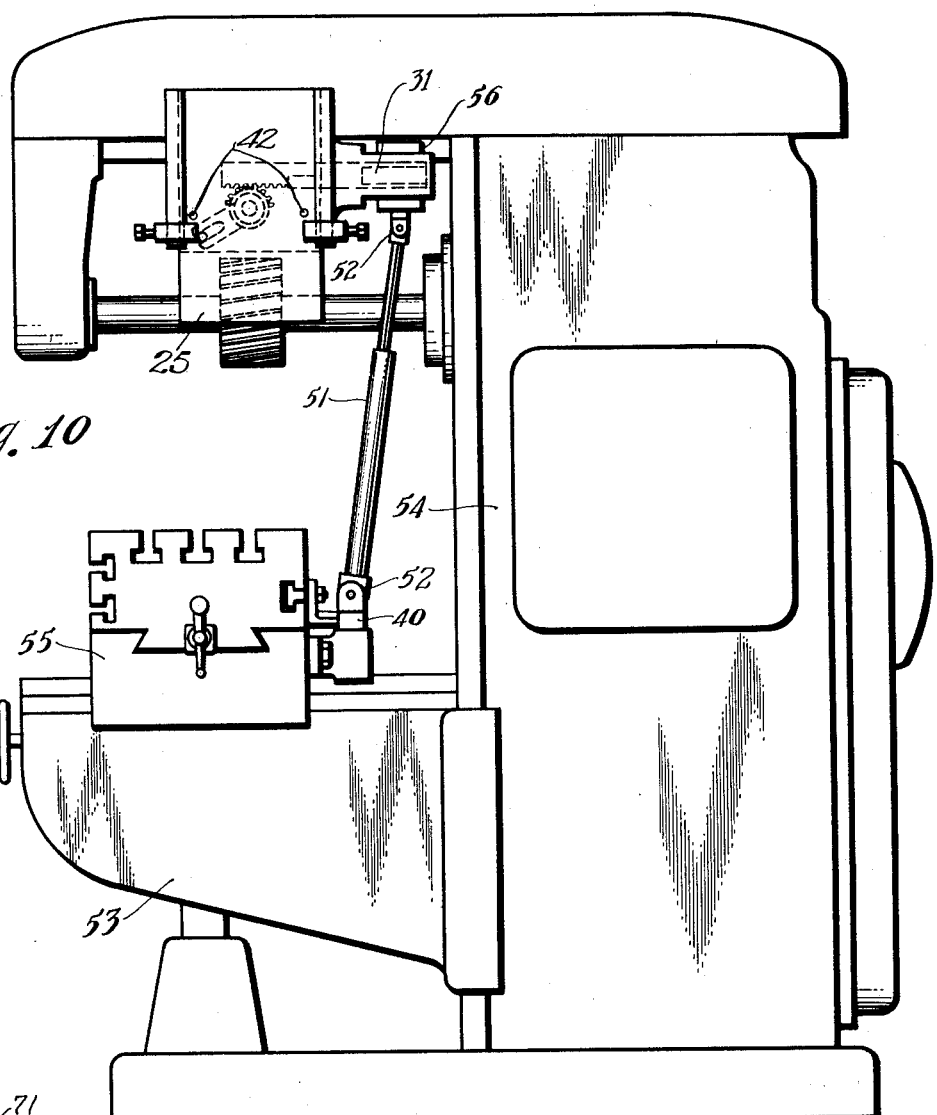
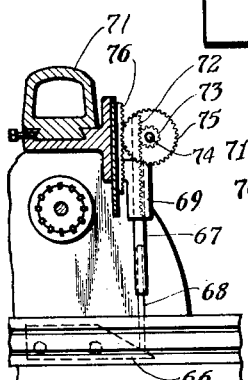
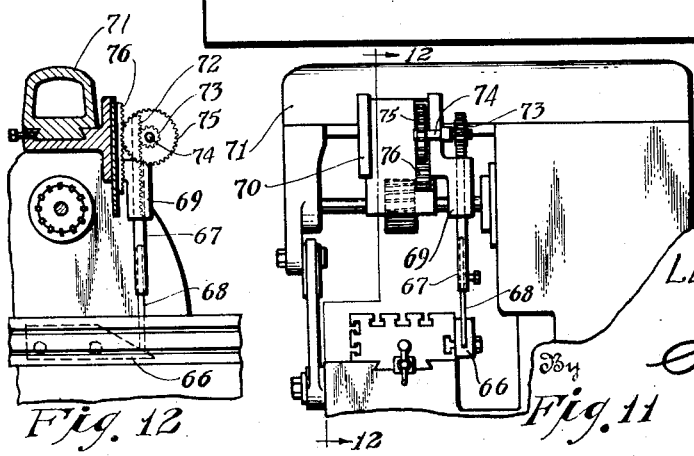
Inventor
LESTER F. NENNINGER
By H. K. Parsons
Attorney Patented Dec. 12, 1933

1,938,778

UNITED STATES PATENT OFFICE 1,938,778

CUTTER GUARD

Lester F. Nenninger, Cincinnati, Ohio, assignor to The Cincinnati Milling Machine Company, Cincinnati, Ohio, a corporation of Ohio Application November 14, 1930
Serial No. 495,571

14 Claims. (Cl. 74—105)

This invention relates to milling machines and more particularly to improved means for guarding the cutters thereof.

One of the principal objects of this invention is to provide new and improved means for shielding the cutter of a machine tool to thereby protect the operator from danger or mishap while loading and unloading the machine.

Another object of this invention is to provide an improved guard for the cutter of a milling machine that will automatically be moved into a shielding position when the work support is in a chucking position thereby preventing injury to the operator from accidental contact therewith, as well as preventing injury to the cutter itself from any accidental blows by tools or work.

A further object of this invention is to provide a detachable cutter guard for milling machines that may be readily attached to either a fixed or movable support for automatic operation by a table reciprocably mounted thereon.

Other objects and advantages of the present invention should be readily apparent by reference to the following specification considered in conjunction with the accompanying drawings illustrative of one embodiment thereof, but it will be understood that any modifications may be made in the specific structural details hereinafter disclosed, within the scope of the appended claims, without departing from or exceeding the spirit of the invention.

Referring to the drawings in which like reference numerals indicate like parts:

Figure 1 is an elevation showing one embodiment of the present invention applied to a bed type machine tool.

Figure 2 is a detail as viewed on the line 2—2 of Figure 1.

Figure 3 is a vertical section on the line 3—3 of Figure 1.

Figure 4 is a detail section on the line 4—4 of Figure 1.

Figure 5 is a detail of the dog control as viewed on the line 5—5 of Figure 1.

Figure 6 is an end view, partly in section, showing a double cutter guard.

Figure 7 is a detail view of the operating arms for the double guard.

Figure 8 is a section on the line 8—8 of Figure 6.

Figure 9 is a modified view showing independently operated guards.

Figure 10 is a modified form of the invention suitable for attachment to a knee and column type milling machine.

Figure 11 is an elevation of a cam operated cutter guard.

Figure 12 is a section on the line 12—12 of Figure 11.

Referring to the drawings and more particularly to Figures 1 to 5 inclusive, the reference numeral 10 indicates the bed of a machine tool, such as a milling machine, having an upstanding or column portion 11 upon which is formed vertical guideways 12 for supporting and guiding a spindle carrier 13 adjustably mounted thereon. The spindle carrier has journaled therein a cutter spindle 14 adapted to be power rotated by suitable means for actuating a cutter arbor 15 having a cutter 16 secured thereon. The outboard end of the arbor is journaled in a pendant 17 depending from the under side of an overarm 18 projecting from and adjustably mounted on the spindle carrier 13. Since the overarm is mounted on the spindle carrier, it will be movable vertically therewith. A translatable work support or table 19 is reciprocably mounted in suitable guides formed in the bed 10 for translation with respect to the cutter 16.

In the operation of machine tools and more particularly in milling machines, the time at which the machine is loaded varies with different cycles of operation, as, for instance, in a one-way cycle the work is loaded or chucked in its fixture while the latter is stationary after which it is moved with relation to the processing tool to effect the desired stock removal and then returned to the chucking position to have the finished work removed. During unloading the cutter may or may not be rotating but if rotating it presents a constant source of danger to the operator while changing work and if not rotating there is still a possibility of the cutter being accidentally damaged by a work piece being removed or by a tool used to clamp or unclamp the work in its fixture.

In other methods of operation, work fixtures are placed upon opposite ends of a reciprocating table and while the work in one fixture is being processed the work in the other fixture is being replaced. In such cases the work support, as well as the tool, is constantly moving increasing the possibility of harm to the operator, as well as damage to the cutter due to the close working conditions.

For the above reasons a cutter guard, which forms the subject matter of this invention, has been provided to protect the operator from injury while working in close relation to a cutter and also to prevent possible damage to the cutter from accidental blows by a work piece or by hand tools used in connection with the operation of the machine.

As more particularly illustrated in Figures 1 and 3, the reference numeral 20 indicates the cutter guard frame or housing adapted to be attached to the overarm of a milling machine and, therefore, provided with guideways 21 for adjustment on the guides 22 of the overarm 18. Securing means, such as set screws 23, are provided for fastening the frame in adjusted position. In some types of machine tools where the pendant is supported on its overarm by other means, such as an aperture formed therein, for mounting on the overarm it will, of course, be understood that the cutter guard frame may be provided with a similarly formed aperture for mounting and attaching to the overarm.

The frame or housing 20 is provided with vertical guideways 24 for receiving therebetween the reciprocable guard plate 25 having integrally formed therewith an actuating pin 26. A crank arm 27 is keyed to the end of a horizontal shaft 28 and provided with bifurcations 29 which embrace the pin 26. The shaft 28 is adapted to be oscillated from the dog rotated shaft 30 through a pair of rack and gear segments comprising a segment 31 splined to the upper end of the shaft 30 and meshing with a rack member 32 reciprocably mounted in the housing 20 having rack teeth 33 formed upon a lower face thereof and meshing with the quadrant 34 secured to the end of the shaft 28.

A bracket 35 is secured to a vertical face of the spindle carrier and has a bearing 36 formed therein for rotatably supporting the hub of the gear quadrant 31. The quadrant 31 is fixed in the bracket against longitudinal movement and provided with a splined bore for receiving the vertical shaft 30. The lower end of this shaft is rotatably mounted in a bracket 37 attached to the table support but held against vertical movement. By this construction it is possible to adjust the spindle carrier with respect to the table without breaking the operative connection between the table and the cutter guard.

The cutter guard is adapted to be dog controlled from the reciprocating table and for this purpose a longitudinal T-slot 38 is formed in the side of the table for supporting a suitably formed dog 39 adapted to co-act with a trip member 40 secured to the shaft 30. As shown in Figure 5, the member 40 is provided with a pair of spaced projections 41 to thereby effect rotation of the shaft 30 upon contact with the dog. By the use of a single dog it will be seen that movement of the table in one direction will raise the guard by rotating the shaft 30 which, through the rack and gear connections, will cause rotation of the crank arm 27 thereby moving the guard to one extreme position and movement of the table in the other direction will move the guard to its other extreme position.

In order to adjust and limit the downward movement of the guard, pins, such as 42, are fixed in the guard plate for contact with adjustable stop members, such as 43, secured to the margin of the plate guideway as by set screws 44.

For the purpose of maintaining the guard in a raised position, a detent mechanism is provided comprising the spring pressed ball 57 mounted in the frame 20 for engaging the socket 58 formed in the rack member 32 as it returns to raise the guard plate.

It should now be apparent from the foregoing that a milling machine operating on a one-way cycle may have a table dog, such as 39, properly positioned to lower the cutter guard into a shielding position at the completion of the cutting operation to thereby protect the operator from injury or the cutter from damage during the work changing operation and elevate it therefrom prior to the next operation.

In Figures 6, 7 and 8, a modification is shown in which two guards are utilized, such a construction being suitable where the machine tool is operating upon a reciprocating cycle and it is necessary to load and unload work at each end of a moving table, or in other words, the operator must work alternately upon opposite sides of a constantly rotating cutter.

The table 19, which is adapted to be reciprocated by suitable known power means capable of being controlled by dogs, such as 59, 60, 61 and 62 carried by the table, co-acting with a trip plunger 63 all in a well known manner, is provided with suitable work holders 64 and 65 for subjecting work to the action of the cutter. The shaft 28 is provided with crank arms 45 and 46 secured to opposite ends thereof but in 180° phase relation. A dog 39 is secured to the rear of table midway between the reversing dogs 61 and 62 secured to the front of the table whereby the guards 47 and 48 will reverse their positions at the time that the table in its movement attains a position in which the work pieces upon opposite ends thereof are equally spaced from the cutter. In other words, one of the guard plates will move down to a position between the cutter and a receding finished work piece and the other guard will simultaneously raise to permit an approaching unfinished work piece to proceed toward the cutter.

If it is so desired, the guards may be independently operated and in such cases either simultaneously or at slightly different times as more particularly illustrated in Figure 9. In this figure, the guard plates 46' and 47' are reciprocably mounted in a supporting frame similar to that shown in Figure 6 but provided with separate operating shafts 49 and 49' actuated by independent dogs 50 and 50'. By the utilization of individual actuating mechanisms for each guard, they may be moved at different times dependent upon the positioning of the respective dogs.

In the application of this invention to a knee and column type of machine, a modification of which is shown in Figure 10, the shaft 30 is displaced by a universal telescoping shaft 51 having universal joints 52 on opposite ends thereof to form a flexible driving connection between the trip member 40 and the gear segment 31. This permits vertical adjustment of the knee 53 on the column 54 of the machine, as well as lateral adjustment of the saddle 55 toward or from the column 54 without breaking the operating connection to the guard. Attention is invited to the fact that the bearing 56 for the upper end of the telescoping shaft is integrally formed with the guard frame thereby permitting longitudinal adjustment of the guard on the overarm.

A simplified form of the invention is illustrated in Figures 11 and 12 in which embodiment the means for operating the cutter guard takes the form of a cam plate 66 attached to the rear of the table. A vertical rod 67 having a cam follower 68, longitudinally adjustably mounted in the end thereof, is reciprocably mounted in a bearing 69 integral with the cutter guard frame 70 which is detachably mounted on the overarm 71 of the machine. This shaft has rack teeth 72 cut in it which engage a pinion 73 secured to the end of the shaft 74 for rotating the gear 75 attached to the opposite end to effect movement of the guard plate through a rack 76 secured to the face thereof. The ratio between the pinion and the gear is sufficiently large so that the height of the cam plate may be maintained within reasonable proportions and still effect whatever length of vertical movement is desired in the guard. It will be noted from Figure 12 that the guard plate would drop under the urge of gravity except for the rack 76 attached thereto engaging the gear 75 which, through its shaft and pinion, transmits this urge to the vertical shaft 67 resting on cam 66. From this it is seen that gravity tends to urge the guard downward while the cam acts to prevent it. Therefore, a depression in the cam will effect a downward movement of the shutter and a rise on the cam will effect upward movement. By suitably forming the cam, the cutter guard may be moved up or down at any point in the movement of the table. Attention is invited to the fact that by making the cam follower 68 adjustable in the rod 67 the total length of the operating rod and its follower may be varied in accordance with the distance between the cutter and work.

It should now be apparent from the foregoing that a cutter guard has been provided suitable for attachment to a machine tool, having a cutter support and a work support relatively movable with respect to each other, to effect a cutting operation, as well as adjustable toward and from each other for positioning the work with respect to the cutter, and which is adapted for use with any of the production methods of operation for protecting the operator from injury as well as protecting the cutter from damage under any and all circumstances.

That which is claimed is:

1. A guard mechanism for a milling machine having a frame carrying a rotatable cutter and a power reciprocated work support, said work support being returnable to a chucking position after each processing operation, comprising a guard for said cutter slidably mounted on said frame, mechanism automatically actuated by the slide for moving the guard into cutter shielding position upon return movement of the slide, and an adjustable stop for limiting the extent of guard movement.

2. A guard mechanism for a milling machine having a frame carrying a rotatable cutter and a reciprocating work support slide movable in one direction with respect to the cutter to effect a cutting operation and in an opposite direction to a work loading position, said slide also being relatively adjustable in another direction with respect to the cutter, comprising a guard for said cutter slidably supported by said frame, trip means carried by the slide and trip mechanism automatically actuated by said trip means during movement of the slide to a work loading position for moving the guard to a cutter shielding position including extensible means for maintaining an operative connection between the trip means and the cutter guard during said relative adjustment between the parts.

3. A guard mechanism for a milling machine having a frame carrying a rotatable cutter and a reciprocating work support slide, comprising a pair of reciprocable cutter guards mounted on opposite sides of said cutter, and mechanism including an oscillatable member, and means carried by the slide for actuation of the member during each stroke of the slide for effecting simultaneous raising of one guard and lowering of the other guard.

4. A guard mechanism for a milling machine having a frame carrying a rotatable cutter and a reciprocating work support slide, said cutter and slide being relatively adjustable toward and from one another comprising shields for said cutter slidably mounted on said frame upon opposite sides of the cutter, said shields being alternately movable to a cutter protecting position, independent dog actuable mechanisms for each shield controlled by the table for effecting said movement including extensible means for maintaining an operative connection between the slide and mechanism during relative adjustment between cutter and slide.

5. A guard mechanism for a milling machine having a frame carrying a rotatable cutter, a cutter supporting structure including an overarm, and a reciprocating work support slide, comprising a guard plate reciprocably mounted on the overarm and movable into position to guard the cutter during certain positions of the slide, a rotatable member trip actuable by the table, and motion transmitting connections coupling the member to said guard plate whereby the plate will be operated in timed relation to the movement of the table.

6. A guard mechanism for a milling machine having a frame carrying a rotatable cutter, a reciprocating work support slide and an overarm, comprising a guard for said cutter including a housing having guideways therein adjustably mounted on the overarm to a position adjacent said cutter, a guard plate reciprocably mounted in said guideways, an operating mechanism for the plate terminating in a trip member adjacent said table, and trip dogs selectively positioned on the table for engaging said member upon movement of the table to a work loading position to effect movement of the guard plate to a cutter shielding position.

7. A guard mechanism for a milling machine having a frame carrying a rotatable cutter, an overarm extending parallel to the cutter axis and a reciprocating work support slide, comprising a housing having spaced guideways detachably mounted on the overarm and adjustable to a position adjacent the periphery of the cutter, a shielding member slidably mounted on said guideways, a crank arm journaled in the frame and operatively engaging said member, an operating mechanism connected to the crank arm and terminating in a trip member adjacent the slide, trip dogs on the table engagable with said member during movement of the table in one direction to effect rotation of the crank arm and thereby lowering of the shielding member, and upon opposite movement of the table to effect reverse rotation of the crank arm and thereby elevation of the shielding member, and detent means for releasably securing the shielding member in a raised position.

8. A guard mechanism for a milling machine having a frame carrying a rotatable cutter and a reciprocating work support slide, said slide carrying spaced control dogs for determining the direction of movement thereof comprising a guard for said cutter slidably mounted on said frame in interposed relation between the cutter and work, guard operating mechanism terminating in a trip member adjacent the slide, control means carried by the slide and engageable with said trip member for effecting removal of the guard during movement of the table in one direction as determined by one of said control dogs, and for effecting return of the guard during movement of the table in a direction as determined by the other control dog.

9. A guard mechanism for a milling machine having a frame carrying a rotatable cutter and a reciprocable work support slide, said slide having spaced dogs mounted on one side thereof for determining its direction of movement, comprising a guard for said cutter slidably mounted on said frame, mechanism for lowering and raising the guard to and from a position between the work and cutter terminating in a trip member adjacent the table, a control dog for said trip member carried by the slide on the side opposite to the direction control dogs and adapted during slide movement in a direction determined by one of said direction control dogs to effect movement of the work toward the cutter to raise the guard and during return movement of the table to cause lowering of said guard.

10. A guard mechanism for a milling machine having a frame carrying a rotatable cutter and a reciprocating work support slide, said cutter and slide being relatively adjustable in two directions transverse to one another, said slide being movable in a third direction, comprising shields for said cutter slidably supported by said frame upon opposite sides of the cutter, means for effecting alternate movement of the shields to a cutter protecting position including operating mechanism coupled to each slide and having a portion adjacent the work support, means carried by the table and cooperating with said portion to effect operation of said mechanism, said mechanism also including extensible means for maintaining an operative connection between said portion and with mechanism during relative adjustment in different directions between the cutter and slide.

11. A guard mechanism for a machine tool having a frame carrying a rotatable cutter and a reciprocable work support mounted for movement transversely of the cutter, a pair of guard plates for said cutter mounted on opposite sides thereof and slidably supported by said frame, mechanism for automatically moving one guard to a shielding position and simultaneously withdrawing the other guard from a shielded position including a rotatable member, means operatively connecting opposite ends of said member to the guards, a longitudinal shiftable member operatively connected to the rotatable member and control mechanism including a part carried by the table, and a coacting part carried by the frame, and motion transmitting connections coupling the part carried by the frame to the shiftable member whereby the guards may be operated in timed relation to the movement of the table.

12. A guard mechanism for a milling machine having a frame, a work table reciprocably supported by the frame, a rotatable tool spindle extending transversely of the table, an overarm supported by the frame in parallel relation to the spindle for supporting the outboard end of the spindle, said overarm having guideways coacting with corresponding guideways on the frame for axial adjustment relative thereto, comprising a housing having spaced guideways cooperating with the overarm guideways and adjustable therealong to a position adjacent the periphery of the cutter, a guard for the cutter slidably mounted on said frame, mechanism automatically actuated by the table for moving the guard into a cutter shielding position during movement of the table in one direction and for withdrawing the guard from its shielding position during movement of the table in an opposite direction.

13. A guard mechanism for a milling machine having a frame carrying a rotatable cutter, and a reciprocating work support comprising a housing carried by the frame, parallel guideways formed in the housing and extending transversely to the direction of the cutter axis, a guard plate reciprocably mounted in said guideways, operating mechanism for the plate including a rotatable member operatively connected with the guard, a reciprocable connecting rod for effecting rotation of the member, a trip operable member connected to said rod, and trip dogs selectively positioned on the table for engaging said member during movement of the table to shift the guard plate to a cutter shielding position.

14. A guard mechanism for a milling machine having a frame carrying a rotatable cutter, an overarm extending parallel to the cutter axis and a reciprocating work support slide, comprising a housing having spaced guideways detachably mounted on the overarm and adjustable to a position adjacent the periphery of the cutter, a shielding member slidably mounted on said guideways, a rotatable member journaled in the frame and operatively connected to the shielding member for effecting reciprocation thereof, and operating mechanism connected at one end to the rotatable member and terminating at the other end in a trip member adjacent the slide, and cam portions on the table engageable with said member during movement of the table to effect raising and lowering of the shielding member.

LESTER F. NENNINGER.